United States Patent [19]

Bianco

[11] Patent Number: 5,373,780
[45] Date of Patent: Dec. 20, 1994

[54] APPARATUS FOR CONTROLLING THE RIPENING OF FRESH PRODUCE

[75] Inventor: Michael Bianco, Miami, Fla.

[73] Assignee: Cool Care Consulting, Inc., Deerfield Beach, Fla.

[21] Appl. No.: 888,679

[22] Filed: May 22, 1992

[51] Int. Cl.$^5$ .............................................. A23B 7/00
[52] U.S. Cl. ........................................ 99/475; 99/474; 99/476; 34/197; 62/329; 165/61; 312/116; 312/236
[58] Field of Search .................... 99/467, 472–476; 34/192, 194, 196, 197; 62/329; 165/61; 312/116, 236; 454/118, 174

[56] References Cited

U.S. PATENT DOCUMENTS

| | | | |
|---|---|---|---|
| 1,262,860 | 4/1918 | Smith | 34/196 |
| 1,410,719 | 3/1922 | Rea | 34/194 |
| 1,736,788 | 9/1929 | Huston . | |
| 1,939,957 | 12/1933 | Day . | |
| 2,079,304 | 5/1937 | Polderman . | |
| 2,279,847 | 4/1942 | Stebbins . | |
| 3,008,838 | 11/1961 | Brunsing et al. . | |
| 3,123,988 | 3/1964 | Richman . | |
| 3,184,862 | 5/1965 | Frank | 34/194 |
| 3,389,946 | 6/1968 | Nicolaus et al. | 312/236 |
| 3,638,450 | 2/1972 | Falk | 62/329 |
| 3,982,584 | 9/1976 | Spanoudis | 312/236 |
| 4,354,549 | 10/1982 | Smith . | |
| 4,426,923 | 1/1984 | Ohata | 99/468 |
| 4,566,377 | 1/1986 | van Buytene | 99/474 |
| 4,676,152 | 6/1987 | Tsuji et al. | 99/468 |
| 4,824,685 | 4/1989 | Bianco . | |
| 5,041,298 | 8/1991 | Wallace et al. . | |

FOREIGN PATENT DOCUMENTS 2651645  3/1991  France .................. 99/467

OTHER PUBLICATIONS

F. G. Mitchell, Rene Guillou, R. A. Parsons, "Commercial Cooling Of Fruits And Vegetables", Division Of Agricultural Sciences, University of California, 1972.

*Primary Examiner*—Mark Spisich
*Attorney, Agent, or Firm*—Kenyon & Kenyon

[57] ABSTRACT

An apparatus is provided for controlling the ripening of produce. The apparatus includes a chamber having a ceiling, a floor and a plurality of walls. Positioned in the chamber is a support and position structure to support two rows of palletized produce and to space the palletized produce away from the walls to define a fluid circulation space around the palletized produce. The rows of palletized produce are spaced apart to define an interstitial volume therebetween. Each row of palletized produce includes at least an upper and a lower tier with a vertical spacing therebetween. A flexible sealing strip is affixed to the support and position structure to generally seal the vertical spacing between the tiers from the fluid circulation space. A fluid control mechanism is provided to exhaust fluid from the interstitial volume and to introduce a controlled fluid into the fluid circulation space to create a pressure differential between the interstitial volume and the circulation space to thereby force the controlled fluid to flow generally uniformly through the palletized produce.

20 Claims, 9 Drawing Sheets

APPARATUS FOR CONTROLLING THE RIPENING OF FRESH PRODUCE

FIELD OF THE INVENTION

This invention relates generally to methods and apparatuses for controlling the ripening of fresh produce, particularly fresh fruit like bananas.

BACKGROUND OF THE INVENTION

Bananas and other fresh produce are typically transported from the growing fields to a processing facility where they are placed in specially designed ripening rooms. These ripening rooms are provided with insulated, gas tight wall and roof panels and include an air handling unit to control the circulation and temperature of the air within the ripening room. In this manner, the ripening of the fresh produce may be controlled in accordance with a predetermined ripening schedule such that the fruit is properly ripened at the time it is scheduled for delivery to retail outlets. To advantage, ethylene gas is dispersed into the room at a preselected time to facilitate a uniform ripening of the produce. Accordingly, the use of ripening rooms enables the delivery of high quality produce to retail outlets without the constraint of having to schedule delivery in accordance with the natural ripening process of the fruit and further obviates problems associated with accelerations and decelerations of the ripening process due to changing conditions during the transportation of the produce.

In one advantageous prior ripening room arrangement, the produce is packed into unitized shipping modules comprising individual protective boxes which are block-stacked on pallets. The palletized produce is inserted into a ripening chamber having a floor, ceiling and front, rear and side walls and being of suitable dimensions to enclose two spaced rows of the palletized produce. The two rows are spaced apart from one another within the chamber to define an interstitial volume between the rows, which substantially forms a low pressure plenum. There is also provided sufficient spacing between the palletized produce and the ceiling and walls of the chamber to define a high pressure air space around and above the inserted produce load.

A tarp arrangement is placed over the top and one end of the spacing between the two rows of palletized produce to seal off the low pressure plenum from the high pressure air space. Exhaust fans are arranged in a sealed relation at the opposite end of the spacing between the rows to withdraw air from the spacing and thereby create a pressure differential between the tarp sealed plenum and the high pressure air space. Air is introduced by an air handling unit outside the plenum. The air is forced by the pressure differential between the high pressure air space and the low pressure plenum to flow through openings formed in the sides of the boxes, around the produce contained therein and into the low pressure plenum to be exhausted by the fans. In this manner, a forced air circulation flows uniformly throughout the produce load in the chamber to uniformly control the temperature of the produce with a minimal temperature differential throughout the produce load. The temperature and flow rate of the air introduced into the chamber by the air handling unit can be accurately controlled to achieve a desired ripening rate for the produce.

In one known ripening room, the palletized produce is stacked in a two tier arrangement to increase the quantity of produce that can be processed for a given amount of floor space.

SUMMARY OF THE INVENTION

A ripening room for controlling the ripening of fresh produce is provided. The ripening room includes a metal frame structure for positioning and supporting two rows of vertically spaced palletized produce units. The two rows are spaced apart to define a space therebetween. Tarp material is provided to cover the upper and front sides of the rows of produce to enclose the space between the rows. A plurality of blowers are mounted adjacent the space to draw air out and create a low pressure plenum. The ripening room is provided with an air handling unit to control the temperature of the air outside the enclosed space. As a result of the lower pressure in the enclosed space, air outside the enclosed space is drawn through the openings in the boxes into the enclosed space. In this manner, air circulation occurs uniformly through the boxes allowing careful control of the ripening of the produce therein.

According to one aspect of the invention, each row of palletized produce includes three separate tiers. This allows a substantially greater quantity of produce to be processed for given floor space.

According to another aspect of the invention, an automated tarp laying mechanism is provided to allow easy covering and uncovering of the rows of palletized produce with tarp material. Moreover, the floor of the ripening room is provided with concrete curbs that are tapered to guide lift trucks carrying palletized loads into the ripening room. The tapered curbs thereby reduce damage to the ripening room while produce is being loaded or unloaded.

According to another aspect of the invention, support rails are provided with rollers to allow easy insertion and removal of palletized loads in the upper and middle tiers. The support rails are also flared at their front ends to guide palletized loads as they are loaded on the support rails.

According to yet another aspect of the invention, a portion of the frame support structure comprises a series of spaced apart support frames. This enables tarp coverage of produce even when only a portion of the ripening room is filled with palletized produce loads.

DETAILED DESCRIPTION

Figure 1:
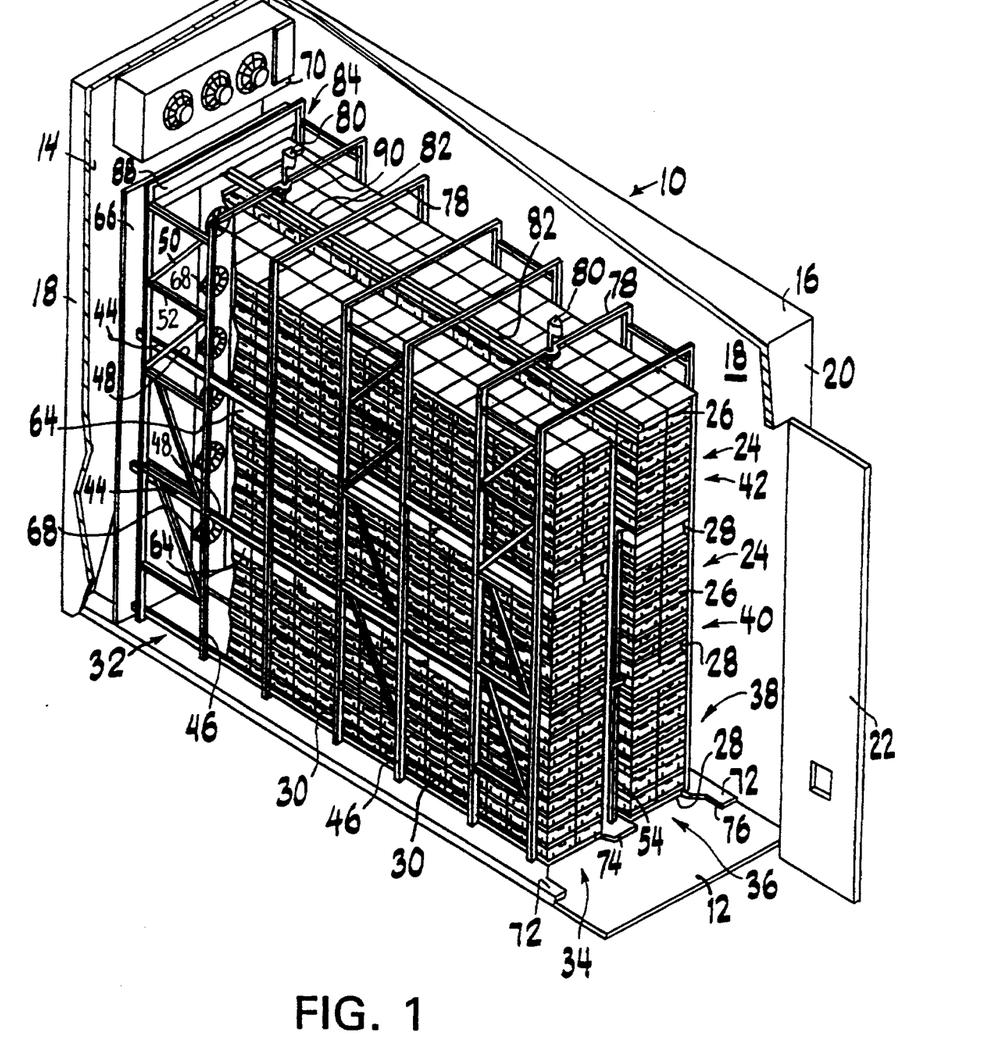
FIG. 1 is a perspective view of a ripening room in accordance with the present invention with parts of the outer walls broken away to illustrate the arrangement of palletized produce loads within the room.

FIG. 1 illustrates a ripening room according to the present invention and generally indicated by reference numeral 10. The ripening room 10 includes a floor 12, rear wall 14, ceiling 16, sidewalls 18 and a front wall 20. The front wall 20 is provided with a pair of doors 22 (only one shown), which can be opened to remove or insert produce in the room 10, as required. The walls, doors and ceiling 14, 18, 20, 22, 16 are insulated and form a generally tight gas chamber for the treatment of produce, as will appear.

Produce is moved into and out of the room 10 in separate palletized loads 24. Each palletized load 24 comprises a plurality of protective boxes 26 to unitize and protect the produce. The protective boxes 26 are block-stacked on pallets 28 for easy handling during their insertion and removal to and from the ripening room 10. Each pallet 28 may be 40 inches by 48 inches with 48 protective boxes tightly block-stacked thereon. Pursuant to the invention, each of the protective boxes 26 includes side openings 30, which correspond with similar openings in adjacent boxes 26 to facilitate airflow through the boxes 26.

The overall dimensions of the ripening room 10 are suitable to house two 3-tiered rows of palletized produce 24, and may have, for example, a height of 28 feet, a width of 11 feet, and a length of 29 feet.

A metal frame structure 32 is provided to support and position the palletized produce loads within the ripening room 10 into two spaced apart rows 34, 36, each having a lower tier 38, a middle tier 40 and an upper tier 42. The spacing between the rows 34, 36 of palletized produce may be, for example, 18 inches.

The frame structure 32 includes a plurality of horizontal members 44, extending longitudinally along a substantial section of the length of the ripening room 10 connected with a plurality of vertical support columns 46 spaced along a substantial length of the room 10. The horizontal members 44 are spaced inwardly from an adjacent sidewall 18 a predetermined distance such as, for example, 11 inches. The horizontal members 44 engage and space the palletized loads 24 from the walls 18.

Figure 8:
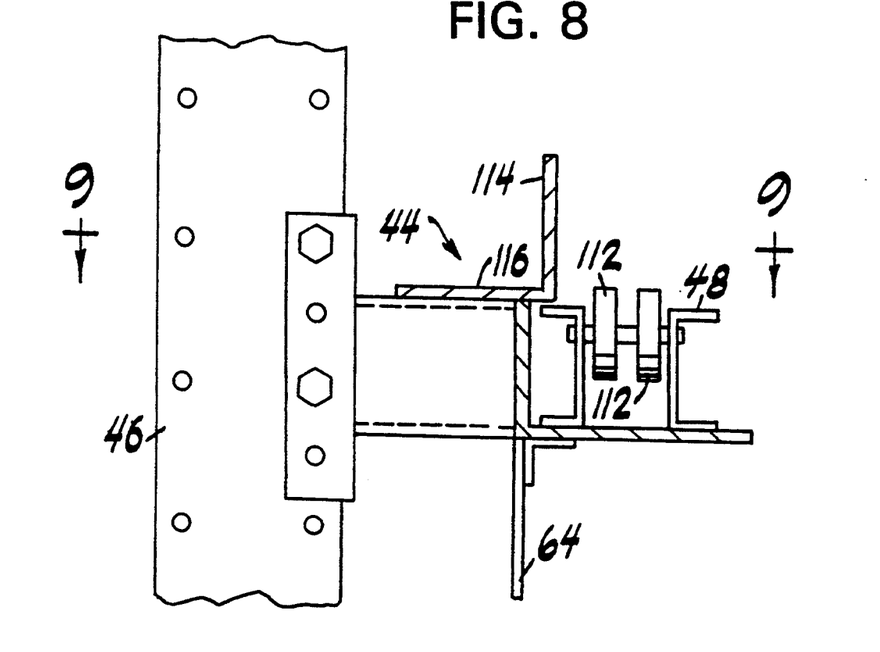
FIGS. 8–10 are views of support rails in accordance with the present invention.
Figure 9:
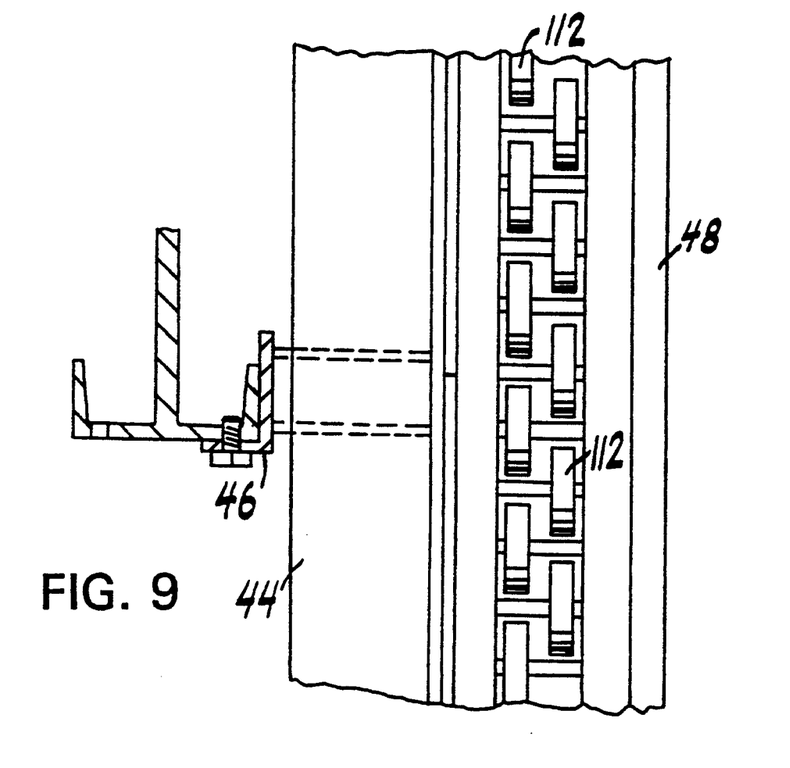
Figure 10:
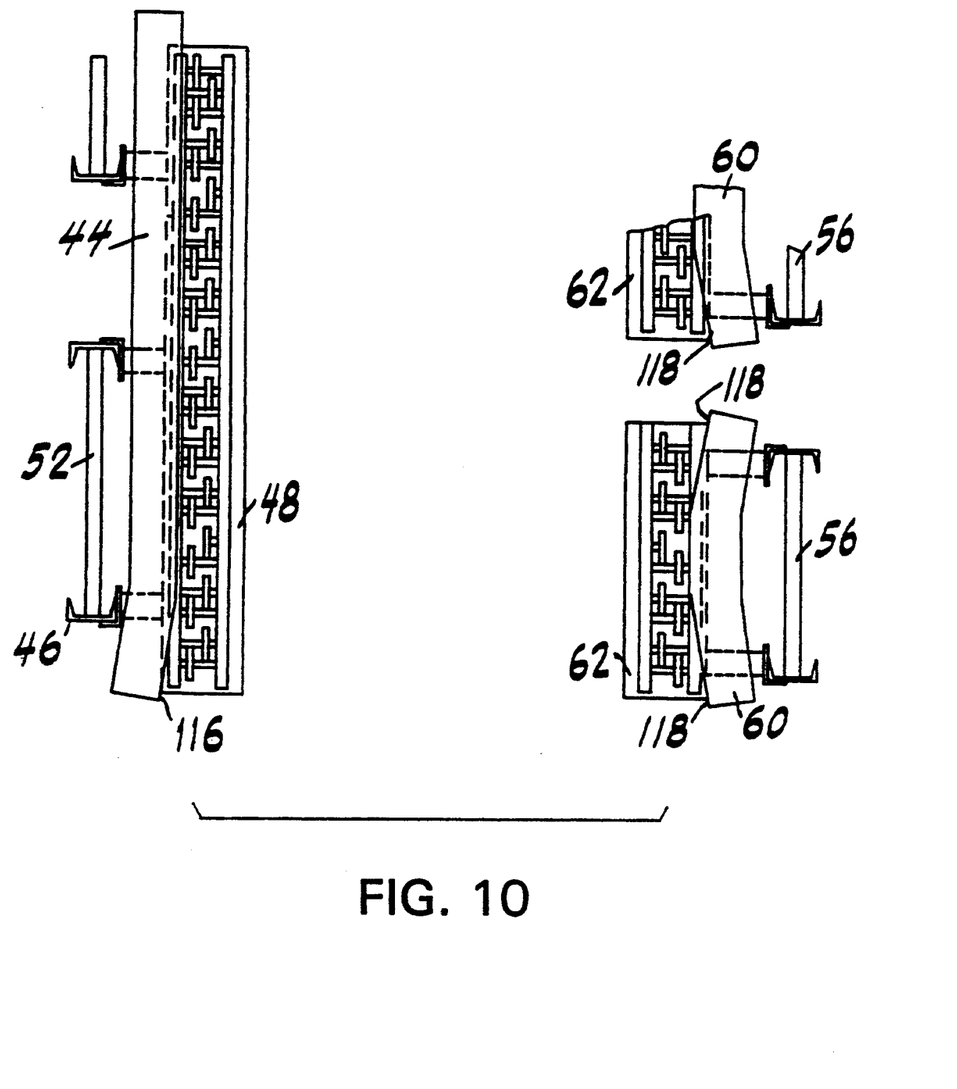

As shown in greater detail in FIGS. 8–10, a series of support rails 48 are mounted on the vertical support columns 46 and the horizontal members 44. The support rails engage and support the outer periphery of the pallets 28 on the upper and middle tiers of the frame structure. The horizontal members are also positioned to reduce unwanted airflow through the pallets as will be discussed later.

A series of cross beams 50 and horizontal beams 52 are secured to the vertical support columns 46 to provide structural integrity to the frame structure 32.

Arranged midway between the vertical support columns 46, generally at the center of the ripening room 10 is a middle support structure 54. As shown in greater detail in FIG. 2, the middle support structure 54 comprises a series of middle support frames 56 with vertical support columns 58 and horizontal members 60 to support additional support rails 62. The support frames 56 are spaced apart such that there is no connection between the horizontal members 60 of each frame 56.

The palletized loads 24 are supported on the floor 12 of the ripening room and the support rails 48, 62 in three tiers 38, 40, 42. Spaces thus exist between the top protective boxes 26 of each unit of palletized produce 24 and the lower surface of the pallet 28 of the palletized load 24 positioned directly thereabove. Each space may have a height of about six inches.

Pursuant to a feature of the present invention, a longitudinally extending sealing strip 64 is formed as a downward extension of the horizontal members 44 supporting the upper and middle tier pallets to block airflow into space between the palletized loads 24. The sealing strip 64 is preferably a clear vinyl material. It may comprise a plurality of segments having dimensions of approximately 12 inches by 25 feet and a thickness of 0.08 inches.

Pursuant to the invention, a baffle wall 66 is connected with the frame structure 32 near the rear wall 14 of the room 10. Palletized loads 24 at the rear of the ripening room 10 are positioned in close contact with the baffle wall 66 to inhibit airflow between the baffle wall 66 and the palletized loads. The baffle wall 66 supports a plurality of exhaust blowers 68, which are axially aligned along the center of the baffle wall 66. The blowers 68 register with apertures formed in the baffle wall 66, which open to the space between the two spaced rows of palletized produce 24.

The ripening room 10 is also provided with an air handling unit 70, which is positioned above the frame structure 32. The air handling unit 70 heats or cools air to be circulated around the produce as required.

Figure 3:
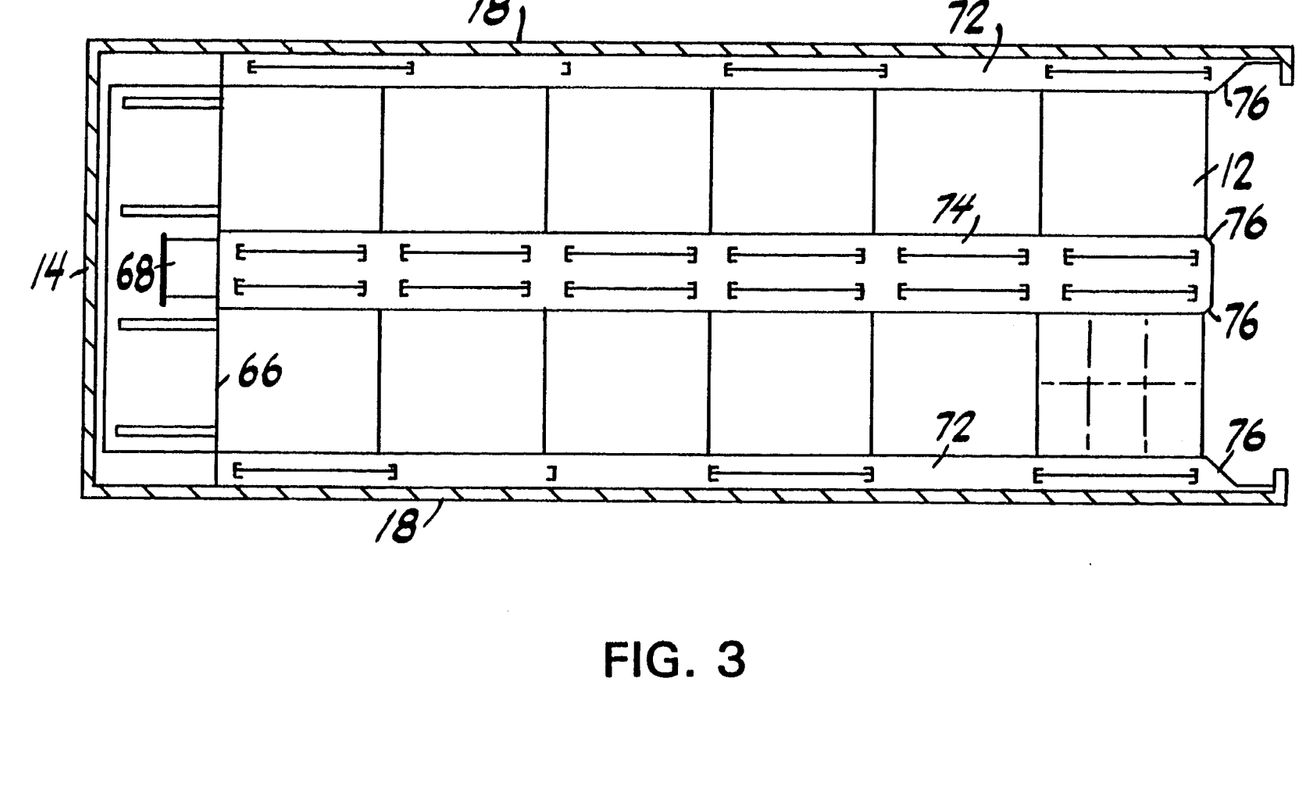
FIG. 3 is a top view of the ripening room floor, showing guide curbs in accordance with the invention.

As shown in FIG. 1 and in FIG. 3, a top view of the floor 12 of the ripening room, the vertical support columns 46 are positioned on a pair of outboard concrete curbs 72. Also, the middle support structure 54 is positioned on a center concrete curb 74. The ends of each of the curbs near the front wall are tapered at 76 to guide lift trucks carrying palletized loads into the ripening room 10 and thereby protect the frame structure 32 from damage. Pallets 28 of the palletized loads 24 of the lower tier 30 of each row are placed on the floor 12 in a channel between an outboard curb 72 and the center curb 74. The curbs 72, 74 are sufficiently high to block airflow through the sides of the pallets 28.

Each of a plurality of overhead beams 78 is connected to the upper ends of the vertical support columns 46 on both sides of the metal frame structure 32. A pair of actuators 80 are mounted on two of the beams 78. The actuators 80 support an I-beam 82, which extends longitudinally along the center of the ripening room 10.

Figure 4:
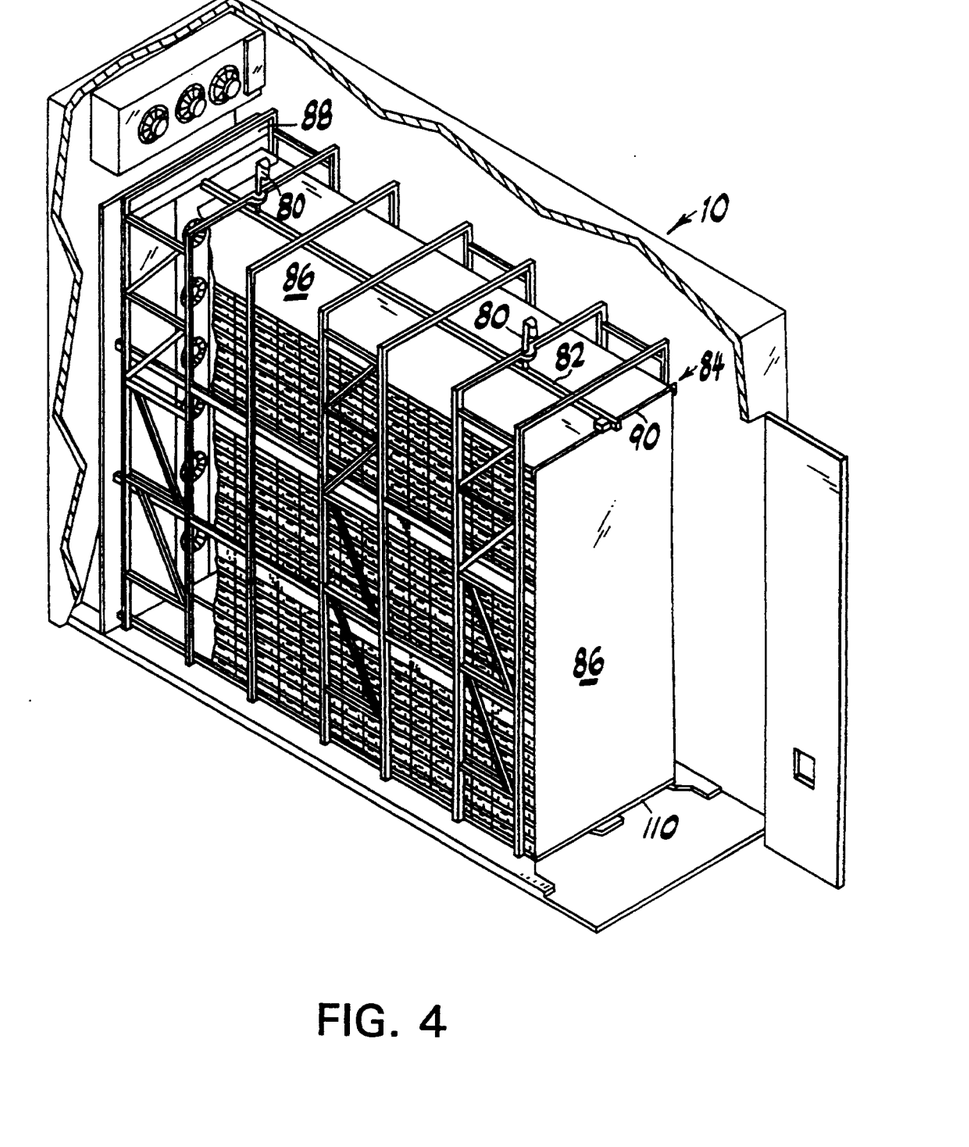
FIG. 4 is a perspective view of the ripening room shown in FIG. 1 with a tarp covering the produce loads.

The ripening room 10 also includes a tarp laying mechanism 84 for laying tarp material 86 over the top and front side of the rows of palletized loads 24 as shown in FIG. 4. The tarp laying mechanism 84 includes a tarp box 88, which is positioned at the upper end of the baffle wall 66, and a tarp extender 90, which slides along the I-beam 82 for positioning the tarp material 86. The tarp extender 90 is connected with a pulley system 92 (shown in FIG. 5).

As shown in FIG. 4, the tarp extender 90 has been moved to the front end of the I-beam 82. Tarp material 86 thereby covers the top and front side of the rows of produce loads 24. With the tarp 86 covering the produce, a generally enclosed space or interstitial volume is formed between the rows of produce loads 24. The enclosed space is defined by the tarp 86, the baffle wall 66, the floor 12 and the two rows of produce 34, 36. The vinyl sealing strips 64 cover the gaps between the tiers 38, 40, 42 of palletized produce.

The exhaust blowers 68 operate to exhaust the air within the interstitial volume between the rows 34, 36 of palletized produce and thereby create a low pressure plenum therein. Thus, the space between the rows of palletized produce 34, 36 will be at a lower pressure than the remaining space in the ripening room 10. The air handling unit 70 operates to introduce a controlled flow of air into the space in the room around the produce loads 24. The pressure differential caused by the operation of the exhaust blowers 68 forces air from the air handling unit 70 to circulate through the openings 30 in the protective boxes 26, around the produce contained therein and into the enclosed space between the rows of palletized produce 34, 36 for exhaustion by the blowers 68.

Due to the arrangement of the tarp 86 and the side sealing effects of the horizontal members 44, the concrete curbs 72, 74, and the sealing strips 64, virtually all of the forced airflow caused by the pressure differential flows uniformly through the openings of the protective boxes 26 and accordingly, around the produce contained therein. This ensures a maximum utilization of the pressure drop to uniformly circulate air throughout the produce load with a most efficient operation of the air handling unit and the exhaust blowers.

The present invention therefore provides a highly advantageous improvement in pressurized ripening systems. The frame structure 32 permits three tiers of palletized produce to be arranged within the room to substantially increase the total amount of produce that may be processed for a given square footage of the facility in which the ripening room is arranged. The configuration of the frame structure 32, including the support rails 48 and sealing strips 64, provides an advantageous arrangement to properly position the produce load 24 and to cause virtually all air circulation to occur generally uniformly through the boxes 26 without pressure leaks through the pallets 28 or through the spacing between the three tiers. The resulting forced circulation through the boxes 26 is therefore controllable to uniformly and accurately control the temperature of the produce load to within a minimal temperature range, for example, plus or minus 1° throughout the produce load.

Figure 5:
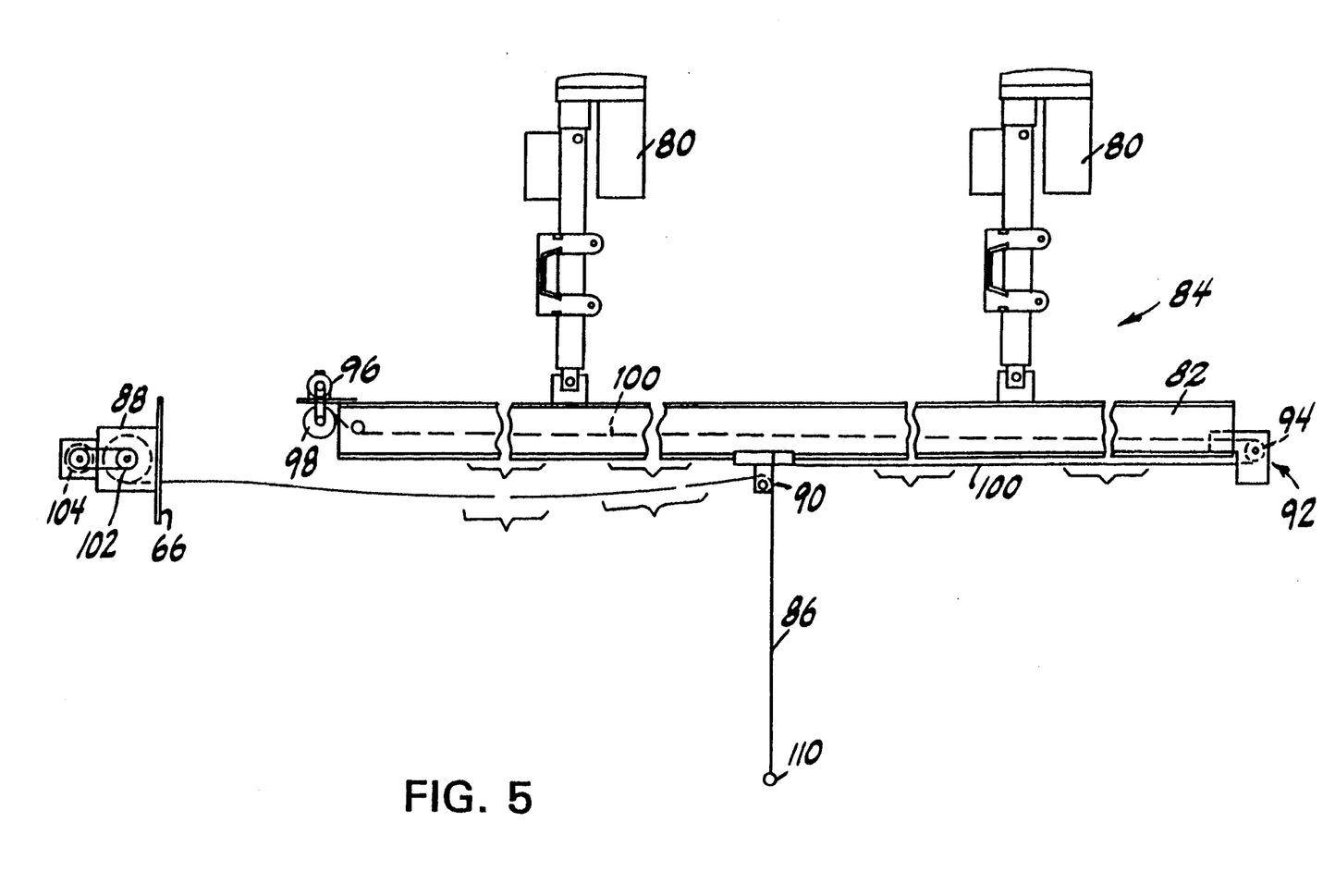
FIG. 5 is a side view of a tarp laying mechanism for covering the produce loads with the tarp in accordance with the invention.

FIG. 5 illustrates the tarp laying mechanism 84 in greater detail. The tarp laying mechanism includes the tarp box 88, which is supported by the baffle wall 66. The tarp laying mechanism 84 also includes the tarp extender 90, for holding and positioning the tarp material 86. The tarp extender 90 is slidable along the longitudinal I-beam 82. A pulley system 90 is provided for moving the tarp extender along the I-beam 82. The pulley system 92 comprises a pulley 94 mounted on the front end of the I-beam 82, an electric motor 96 and a take-up spool 98 mounted on the opposite end of the I-beam 82 and a cable 100 extending from the spool 98 to the tarp extender 90 around the pulley 94.

Figure 6:
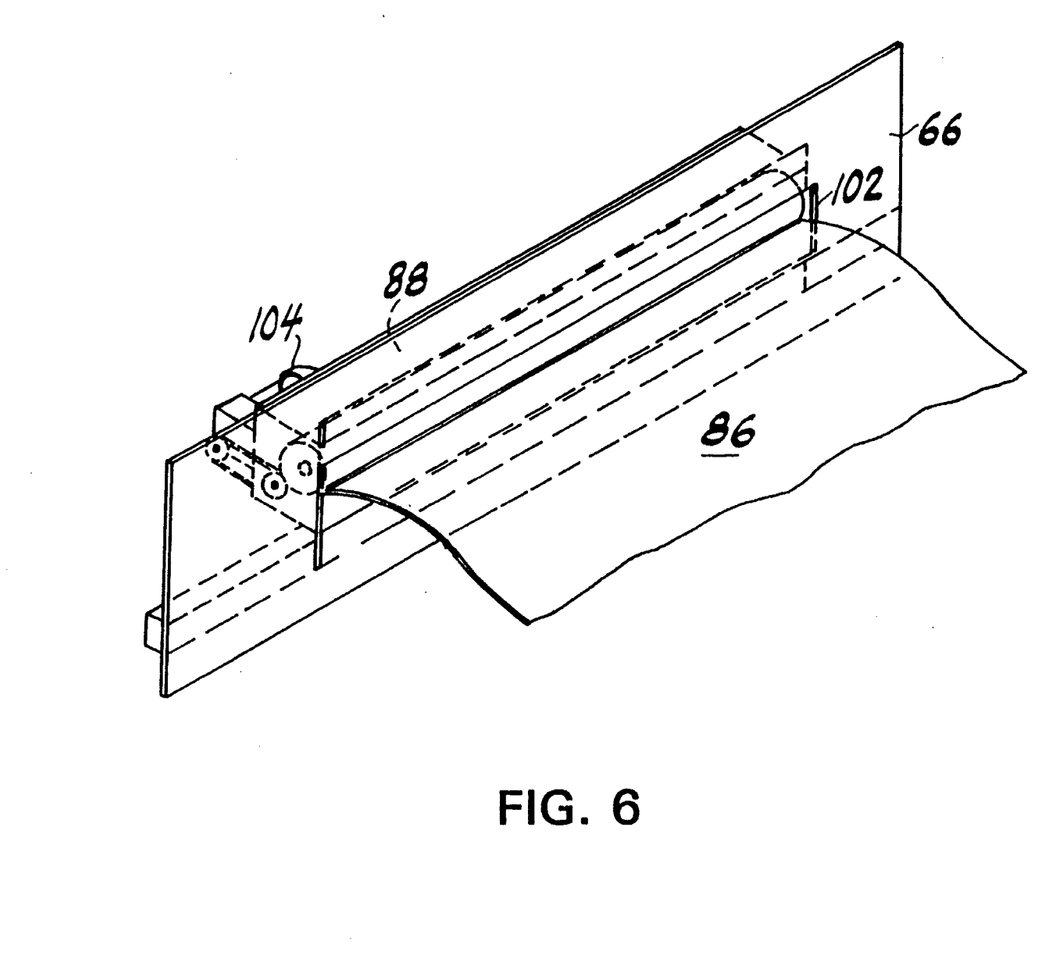
FIG. 6 is a perspective view of a tarp box, which forms part of the tarp laying mechanism shown in FIG. 5.

FIG. 6 is a perspective view of the tarp box 88, which is mounted on the baffle wall 66. The tarp box 88 includes a roller 102 around which tarp material 86 can be rolled. The roller 102 is connected with an electric motor 104 to enable tarp material 86 to be retracted into the tarp box 88. The motor 104 includes an electric brake.

Figure 7:
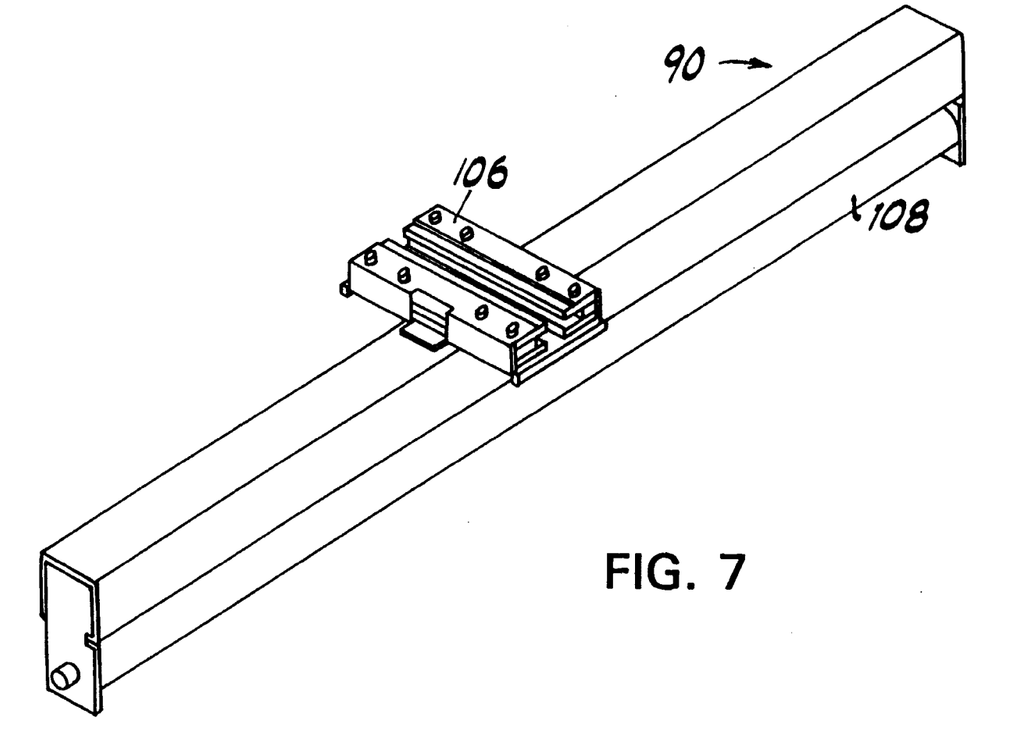
FIG. 7 is a perspective view of a tarp extender, which also forms part of the tarp laying mechanism shown in FIG. 5.

FIG. 7 is a perspective view of the tarp extender 90. The tarp extender 90 includes a sliding bracket 106, which is slidably mounted on the underside of the I-beam. The tarp extender 90 also includes a shaft 108, over which tarp material 86 is positioned.

The tarp laying mechanism 84 can be activated to cover the rows palletized produce 34, 36 with tarp material 86 as shown in FIG. 4. When the rows of palletized produce are uncovered during, for example, loading and unloading, the tarp extender 90 is positioned proximate the tarp box 88 as shown in FIG. 1. To cover the rows of palletized produce, the tarp extender 90 is moved along the I-beam 82 to a position at the edge of the palletized loads 24 nearest to the front wall 20. To move the tarp extender 90, the electric motor 96 in the pulley system 92 is activated to draw the cable 100 connected with the extender 90 into the take-up spool 98. As the tarp extender 90, which engages the end of the tarp material 86, moves toward the front wall 20, it draws tarp material 86 out of the tarp box 88. When the extender 90 has been moved to a position at the edge of the palletized loads 24 nearest to the front wall 20, the electric brake in the tarp box motor 104 is disengaged and a drop weight 110 attached to the end of the tarp 86 causes the tarp 86 to drop to the floor 12, thereby covering the top and front side of the rows of palletized produce as shown in FIG. 4.

To uncover the produce, the tarp box electric motor 104 is activated to retract the tarp 86. When the drop weight 110 at the end of the tarp 86 reaches the tarp extender 90, it engages the extender 90 and pulls the extender 90 along the I-beam 82 toward the tarp box 88. In this manner, the rows of produce can be easily covered or uncovered with tarp material 86 as required. The electric motor 96 of the pulley system 92 works simultaneously to release cable 100 from the spool 98.

In accordance with another feature of the invention, the actuators 80 coupled to the I-beam 82 can be activated to raise the I-beam 82 to facilitate loading or unloading of palletized units in the upper tier.

Figure 2:
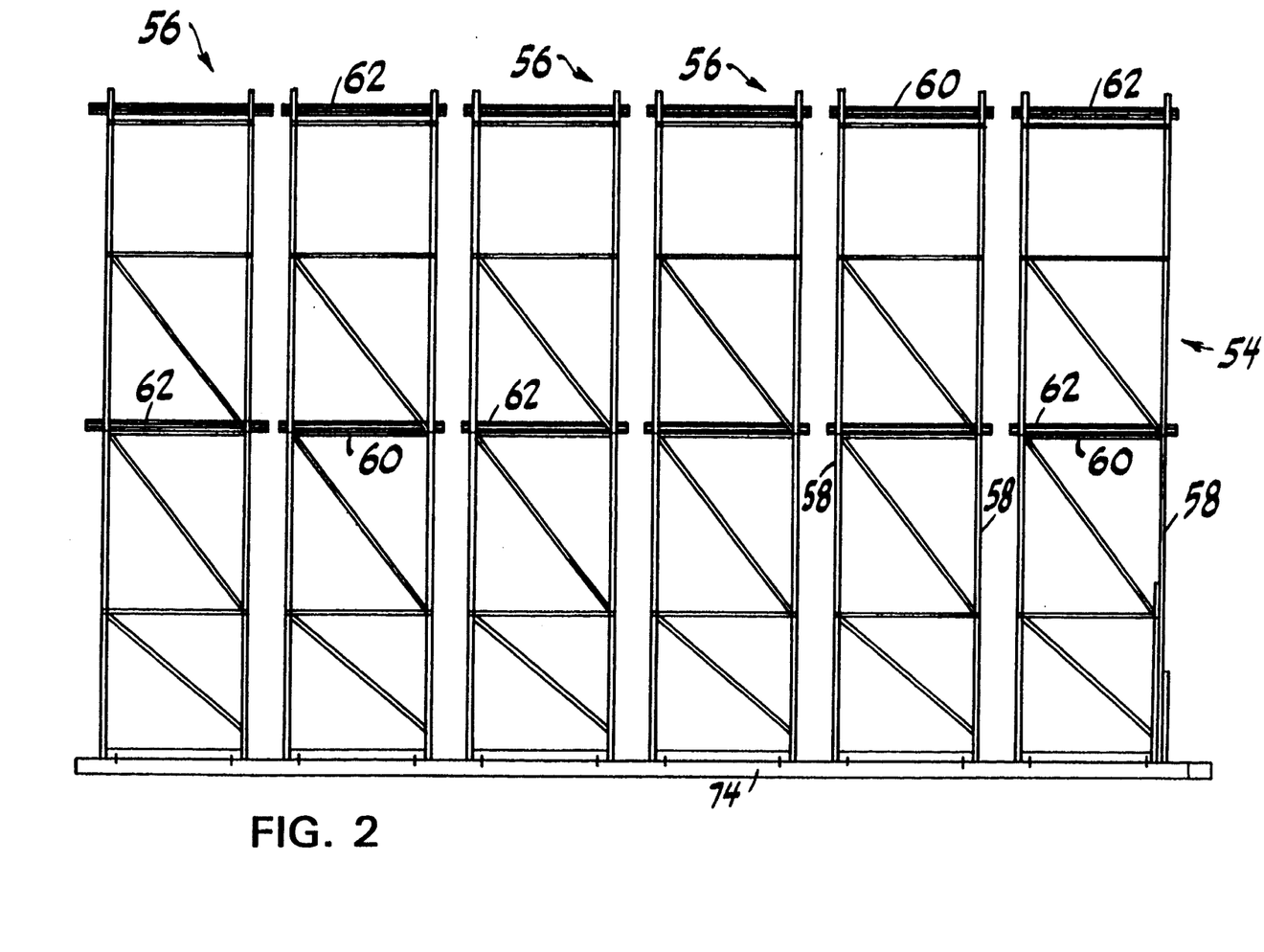
FIG. 2 is a side view of a middle support structure, which forms part of the frame structure of the ripening room shown in FIG. 1.

According to another feature of the invention, the middle support frees 56 are vertically spaced apart as shown in FIGS. 2 and 3. With this arrangement, tarp material 86 can be lowered from the tarp extender 90 at a number of locations along the length of the I-beam 82. Thus, an enclosed space between rows of palletized produce 34, 36 can be created even when the ripening room 10 is only partially filled with palletized produce loads 24. The structure 32 thus includes discrete spaced-apart sections such that the tarp can be positioned between the discrete sections to seal the interstitial volume.

FIG. 8–10 illustrate in greater detail the rail members 48, 62 for supporting palletized loads on the upper and middle tiers 40, 42 of the ripening room 10. FIGS. 8 and 9 are front and top views, respectively, of a part of a rail member 48 connected with a vertical support column 46 and a horizontal member 44. The rail member is provided with a plurality of rollers 112 for allowing easy movement of palletized loads thereon.

The horizontal member 44 comprises a vertical leg 114 and horizontal leg 116. A pallet 28 supported on the rail 48 will have a side surface positioned proximate the vertical leg 114. The vertical leg 114 is sufficiently high to block unwanted air flow through the pallet 28.

The vinyl sealing strip 64 extends downward from the rail member 48 to seal space between the rail member 48 and the upper surface of a palletized load on a tier directly thereunder.

FIG. 10 illustrates another feature of the invention. Shown in the figure is the front end of a support rail 48 connected with a vertical support column 46 and corresponding support rails 62 connected with the middle support frames 54. The front end of the horizontal L-shaped member 44 connected to the support rail 48 is flared at 116 to guide pallets 28 being loaded on the rails. Similarly, the L-shaped horizontal members 60 connected with the rails 62 are flared at both ends thereof 118 to guide palletized loads into and out of the rail structure.

Although the present invention has been described with respect to specific embodiments, various changes and modifications may be suggested to one skilled in the art, and the present invention is intended to encompass such changes and modifications as fall within the scope of the appended claims.

What is claimed is:

1. An apparatus for controlled ripening of produce, comprising:
    a chamber having a ceiling, a floor and a plurality of walls;
    a support and position structure positioned in said chamber to support two rows of palletized produce within said chamber and to space said palletized produce away from said walls to define a fluid circulation space around said palletized produce, said rows of palletized produce being spaced apart to define an interstitial volume therebetween;
    concrete curbs positioned on said floor having ends proximate an entrance to said chamber to guide loading vehicles carrying palletized produce into said chamber and to inhibit damage to said support and position structure; and
    a fluid control mechanism to exhaust fluid from said interstitial volume and to introduce a controlled fluid into said fluid circulation space to create a pressure differential between said interstitial volume and said circulation space to thereby force said controlled fluid to flow generally uniformly through said palletized produce.

2. The apparatus of claim 1, wherein said curbs include tapered ends opening toward said entrance.

3. The apparatus of claim 1, wherein said support and position structure is mounted on said curbs.

4. The apparatus of claim 1, wherein each said row of palletized produce includes upper, middle and lower tiers.

5. The apparatus of claim 1, wherein at least some of said palletized produce is positioned on a pallet on said floor, said pallet having a side adjacent one of said curbs, and wherein said curb is sufficiently high to generally seal said side from airflow therethrough.

6. An apparatus for controlled ripening of produce, comprising:
    a chamber having a ceiling, a floor and a plurality of walls;
    a support and position structure positioned in said chamber to support two rows of palletized produce within said chamber and to space said palletized produce away from said walls to define a fluid circulation space around said palletized produce, said rows of palletized produce being spaced apart to define an interstitial volume therebetween, said support and position structure including support rails to engage and support said palletized produce;
    said support rails having flared ends adapted for receiving and guiding palletized produce being mounted on said support rails; and
    a fluid control mechanism to exhaust fluid from said interstitial volume and to introduce a controlled fluid into said fluid circulation space to create a pressure differential between said interstitial volume and said circulation space to thereby force said controlled fluid to flow generally uniformly through said palletized produce.

7. The apparatus of claim 6, wherein each said row of palletized produce includes at least upper and lower tiers and wherein said support rails support said upper tiers.

8. An apparatus for controlled ripening of produce, comprising:
    a chamber having a ceiling, a floor and a plurality of walls;
    a support and position structure positioned in said chamber to support two rows of palletized produce within said chamber and to space said palletized produce away from said walls to define a fluid circulation space around said palletized produce, said rows of palletized produce being spaced apart to define an interstitial volume therebetween;
    a tarp for covering said interstitial volume to generally seal said interstitial volume from said fluid circulation space;
    a tarp laying mechanism for laying said tarp over said interstitial volume, said tarp laying mechanism including a tarp box for holding said tarp, an extending member positioned on said support and position structure, and a tarp extender slidibly mounted on said member, said tarp extender engageable with said tarp for drawing said tarp out of said tarp box and positioning said tarp over said interstitial volume.

9. The apparatus of claim 8, further comprising a motor for moving said tarp extender.

10. The apparatus of claim 9, further comprising a pulley system having a cable coupled to said motor and said tarp extender.

11. The apparatus of claim 8, wherein said support and position structure comprises discrete spaced-apart sections such that said tarp can be positioned between said discrete sections to generally seal said interstitial volume.

12. The apparatus of claim 8, wherein each row of palletized produce includes at least upper and lower tiers with a vertical spacing therebetween and wherein said apparatus further comprises a flexible sealing strip affixed to said support and position structure to generally seal the vertical spacing between said tiers from said fluid circulation space.

13. The apparatus of claim 12, wherein said flexible sealing strip comprises a vinyl strip.

14. The apparatus of claim 12, wherein each said row of palletized produce includes an upper, lower, and middle tier.

15. The apparatus of claim 8, further comprising concrete curbs positioned on said floor having ends proximate an entrance to said chamber to guide loading vehicles carrying palletized produce into said chamber and to inhibit damage to said support and position structure.

16. The apparatus of claim 15, wherein said curbs include tapered ends opening toward said entrance.

17. The apparatus of claim 13, wherein said support and position structure is mounted on said curbs.

18. The apparatus of claim 15, wherein at least some of said palletized produce is positioned on a pallet on said floor, said pallet having a side adjacent one of said curbs, and wherein said curb is sufficiently high to generally seal said side from airflow therethrough.

19. The apparatus of claim 8, wherein said support and position structure comprises support rails for engaging and supporting the palletized produce and wherein the support rails include a plurality of rollers rotatably mounted thereon for enabling easy movement of the palletized produce on said rails.

20. The apparatus of claim 8, wherein said support and position structure comprises support rails for engaging and supporting the palletized produce and wherein the support rails having flared ends adapted for receiving and guiding palletized produce being mounted on said support rails.

* * * * *

UNITED STATES PATENT AND TRADEMARK OFFICE
CERTIFICATE OF CORRECTION

PATENT NO. : 5,373,780

DATED : December 20, 1994

INVENTOR(S) : Bianco, Michael

It is certified that error appears in the above-identified patent and that said Letters Patent is hereby corrected as shown below:

In column 8, line 67, change "claim 13" to
-- claim 15 --.

Signed and Sealed this

Second Day of January, 1996

Attest:

BRUCE LEHMAN

Attesting Officer      Commissioner of Patents and Trademarks